(12) United States Patent
Kim et al.

(10) Patent No.: US 9,787,996 B2
(45) Date of Patent: Oct. 10, 2017

(54) ENCODING/DECODING METHOD AND APPARATUS USING A TREE STRUCTURE

(71) Applicant: SK TELECOM CO., LTD., Seoul (KR)

(72) Inventors: Sunyeon Kim, Seoul (KR); Jeongyeon Lim, Seongnam-si (KR); Jaehoon Choi, Seongnam-si (KR); Gyumin Lee, Seongnam-si (KR); Joohee Moon, Seoul (KR); Yunglyul Lee, Seoul (KR); Haekwang Kim, Seoul (KR); Byeungwoo Jeon, Seongnam-si (KR); Jongki Han, Seoul (KR); Dongwon Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 295 days.

(21) Appl. No.: 14/608,920

(22) Filed: Jan. 29, 2015

(65) Prior Publication Data

US 2015/0208101 A1 Jul. 23, 2015

Related U.S. Application Data

(63) Continuation of application No. 14/603,892, filed on Jan. 23, 2015, now Pat. No. 9,357,220, which is a (Continued)

(30) Foreign Application Priority Data

Dec. 10, 2009 (KR) .................. 10-2009-0122500
Dec. 10, 2010 (KR) .................. 10-2010-0126315

(51) Int. Cl.
  *G06K 9/36* (2006.01)
  *H04N 19/176* (2014.01)
  (Continued)

(52) U.S. Cl.
  CPC .......... *H04N 19/176* (2014.11); *H04N 19/00* (2013.01); *H04N 19/105* (2014.11);
  (Continued)

(58) Field of Classification Search
  None
  See application file for complete search history.

(56) References Cited

U.S. PATENT DOCUMENTS 5,724,451 A 3/1998 Shin et al.
6,236,758 B1 * 5/2001 Sodagar ............... H04N 19/647
  375/240.19

(Continued)

FOREIGN PATENT DOCUMENTS

KR 1020000071027 A 11/2000
KR 1020040068302 A 7/2004
KR 1020110017721 A 2/2011

OTHER PUBLICATIONS

International Search Report for application No. PCT/KR2010/008860 dated Sep. 7, 2011.

(Continued)

*Primary Examiner* — Andrae S Allison
(74) *Attorney, Agent, or Firm* — Hauptman Ham, LLP

(57) ABSTRACT

An apparatus for encoding image information using a tree structure, performs a method by: encoding a partition flag indicating whether each node, starting from a node of an uppermost layer of the tree structure, is divided into nodes of a lower layer; encoding image information of a block corresponding to a node which is not further divided; and encoding additional information including first information on a minimum block size and second information on a difference between the minimum block size and a maximum block size, the difference between the minimum block size and the maximum block size being a value of a log scale, (Continued)

wherein the first and second information are used for identifying the maximum block size corresponding to the node of the uppermost layer.

10 Claims, 11 Drawing Sheets

Related U.S. Application Data continuation of application No. 13/514,537, filed as application No. PCT/KR2010/008860 on Dec. 10, 2010, now Pat. No. 8,971,656.

(51) Int. Cl.
| | |
|---|---|
| H04N 19/61 | (2014.01) |
| H04N 19/96 | (2014.01) |
| H04N 19/463 | (2014.01) |
| H04N 19/00 | (2014.01) |
| H04N 19/44 | (2014.01) |
| H04N 19/85 | (2014.01) |
| H04N 19/105 | (2014.01) |
| H04N 19/119 | (2014.01) |
| H04N 19/146 | (2014.01) |
| H04N 19/46 | (2014.01) |
| H04N 19/60 | (2014.01) |

(52) U.S. Cl.
CPC ......... *H04N 19/119* (2014.11); *H04N 19/146* (2014.11); *H04N 19/44* (2014.11); *H04N 19/46* (2014.11); *H04N 19/463* (2014.11); *H04N 19/60* (2014.11); *H04N 19/61* (2014.11); *H04N 19/85* (2014.11); *H04N 19/96* (2014.11)

(56) References Cited

U.S. PATENT DOCUMENTS

| | | | |
|---|---|---|---|
| 6,298,163 B1 | 10/2001 | Sodagar et al. | |
| 6,487,319 B1* | 11/2002 | Chai | G06T 9/007 |
| | | | 382/240 |
| 6,640,015 B1* | 10/2003 | Lafruit | H04N 19/63 |
| | | | 382/240 |
| 7,643,560 B2* | 1/2010 | Hong | H04N 21/242 |
| | | | 375/240.12 |
| 8,396,134 B2* | 3/2013 | Hong | H04N 19/105 |
| | | | 375/240.12 |
| 2004/0202246 A1 | 10/2004 | Watanabe et al. | |
| 2005/0195897 A1* | 9/2005 | Cha | H04N 19/63 |
| | | | 375/240.12 |
| 2006/0013313 A1* | 1/2006 | Han | H04N 19/176 |
| | | | 375/240.21 |
| 2006/0088096 A1* | 4/2006 | Han | H04N 19/00 |
| | | | 375/240.03 |
| 2009/0003718 A1* | 1/2009 | Liu | H04N 19/176 |
| | | | 382/238 |
| 2010/0086032 A1* | 4/2010 | Chen | H04N 19/176 |
| | | | 375/240.12 |
| 2012/0269274 A1* | 10/2012 | Kim | H04N 19/176 |
| | | | 375/240.24 |
| 2013/0182775 A1* | 7/2013 | Wang | H04N 19/46 |
| | | | 375/240.24 |
| 2013/0272621 A1* | 10/2013 | Lasserre | G06T 9/00 |
| | | | 382/233 |
| 2014/0079329 A1* | 3/2014 | Shibahara | H04N 19/463 |
| | | | 382/233 |
| 2014/0086336 A1* | 3/2014 | Wang | H04N 19/70 |
| | | | 375/240.26 |

OTHER PUBLICATIONS

Chinese Office Action dated Apr. 5, 2017 corresponding to Chinese Application No. CN 201510064149.0.

* cited by examiner

| 1111<br>(0,0) | 01<br>(0,1) | 011<br>(0,2) | 0<br>(0,3) | 0111<br>(0,4) | 1<br>(0,5) | 10<br>(0,6) | 1<br>(0,7) |
|---|---|---|---|---|---|---|---|
| 00<br>(1,0) | 01<br>(1,1) | 0<br>(1,2) | 1<br>(1,3) | 1<br>(1,4) | 0<br>(1,5) | 0<br>(1,6) | 0<br>(1,7) |
| 00<br>(2,0) | (2,1) | 011<br>(2,2) | 0<br>(2,3) | 10<br>(2,4) | 1<br>(2,5) | 0<br>(2,6) | (2,7) |
| (3,0) | (3,1) | 0<br>(3,2) | 0<br>(3,3) | 1<br>(3,4) | 1<br>(3,5) | (3,6) | (3,7) |

*FIG. 4*

| A | A | A | A | B | A | C | C |
|---|---|---|---|---|---|---|---|
| A | A | A | A | B | B | C | C |
| A | A | A | A | C | C | B | C |
| A | A | A | A | C | C | B | A |
| B | B | B | B | B | B | C | C |
| B | B | B | B | B | B | C | C |
| B | B | B | B | C | C | C | C |
| B | B | B | B | C | C | C | C |

FINAL BITS: 1 0A 1 0B 1 1 0C 0C 1 0B 0C 0C 0C B A B B B C B A

|   |   |   |   |   |   |   |   |
|---|---|---|---|---|---|---|---|
| A | A | B | B | B | A | C | C |
| C | A | A | A | B | B | C | C |
| A | C | A | C | C | C | B | C |
| A | B | C | B | C | C | B | A |
| B | C | B | C | B | B | C | C |
| A | A | B | C | B | A | A | C |
| B | B | C | B | C | A | A | C |
| B | B | B | B | C | C | B | C |

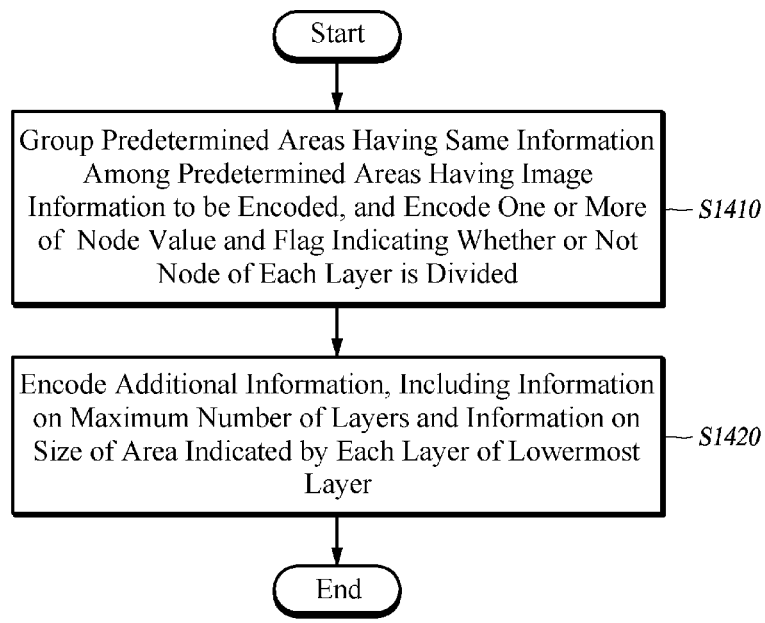

*FIG. 13*

```
                    Start
                      │
                      ▼
┌─────────────────────────────────────────────┐
│ Group Predetermined Areas Having Same       │
│ Information Among Predetermined Areas       │
│ Having Image Information to be Encoded,     │── S1410
│ and Encode One or More of Node Value and    │
│ Flag Indicating Whether or Not Node of      │
│ Each Layer is Divided                       │
└─────────────────────────────────────────────┘
                      │
                      ▼
┌─────────────────────────────────────────────┐
│ Encode Additional Information, Including    │
│ Information on Maximum Number of Layers     │── S1420
│ and Information on Size of Area Indicated   │
│ by Each Layer of Lowermost Layer            │
└─────────────────────────────────────────────┘
                      │
                      ▼
                    End
```

ENCODING/DECODING METHOD AND APPARATUS USING A TREE STRUCTURE

CROSS-REFERENCE TO RELATED APPLICATIONS

The present application is a continuation of U.S. patent application Ser. No. 14/603,892, filed Jan. 23, 2015 which is a continuation of Ser. No. 13/514,537 (U.S. Pat. No. 8,971,656 B2), filed Aug. 2, 2012, which is the National Phase application of International Application No. PCT/KR2010/008860, filed on Dec. 10, 2010, which is based on and claims priority to Korean Patent Application No. 10-2009-0122500, filed on Dec. 10, 2009, and Korean Patent Application No. 10-2010-0126315, filed on Dec. 10, 2010 in the KIPO (Korean Intellectual Property Office). The disclosures of the above-listed applications are hereby incorporated by reference herein in their entirety.

TECHNICAL FIELD

The present disclosure relates to an encoding/decoding method and apparatus using a tree structure. More particularly, the present disclosure relates to a method and apparatus for improving the encoding efficiency and in turn the video compression efficiency by using a tree structure in the encoding of various pieces of image information and the decoding of the resultant encoded data.

BACKGROUND

The statements in this section merely provide background information related to the present disclosure and may not constitute prior art.

Current video data compression technologies include H.261, H.263, MPEG-2, MPEG-4, and the like. In encoding images, the existing video compression technologies divide each image into fixedly sized macroblocks which are composed of rectangular 16×16 pixel areas of luma component and rectangular 8×8 pixel areas of chroma component. All of the luma and chroma components are spatially or temporally predicted, and the resultant predicted residuals undergo transform, quantization, and entropy coding before they are eventually compressed.

An encoding apparatus by the H.264/AVC compression standard subdivides each macroblock into blocks of smaller sizes 16×16, 8×8, and 4×4 to perform an intra prediction encoding wherein 16×16 pixel blocks are processed in one of four prediction modes and 8×8 pixel blocks and 4×4 pixel blocks in one of nine prediction modes. As for an inter prediction encoding, each macroblock may be first divided into blocks of pixel sizes 16×16, 16×8, 8×16, 8×8, 8×4, 4×8, and 4×4. Transform is carried out in units of 8×8 or 4×4 pixel blocks, and quantization of transform coefficients utilizes a scalar quantization. In this way, a video encoding apparatus in the process of intra prediction encoding or inter prediction encoding is supposed to encode not only the target images but also various pieces of information used for the intra prediction encoding and inter prediction encoding.

In addition, there is an outstanding necessity for compressing high-resolution videos such as 4K×2K videos, but no such technology has been developed that can effectively compress a large volume of high-resolution videos. Still, as the video size increases and units of division for encoding a large volume of videos increase, more information is necessary for the intra prediction encoding and inter prediction encoding, resulting in a reduction in the video compression efficiency. Therefore, there is a need for technological development that can improve the encoding efficiency and video compression efficiency.

DISCLOSURE

Technical Problem

To solve the above-mentioned problems and meet the need for a developed technology, the present disclosure mainly seeks to improve the encoding efficiency and in turn the video compression efficiency by using a tree structure in the encoding of various pieces of image information and the decoding of the resultant encoded data.

SUMMARY

An embodiment of the present disclosure provides an encoding apparatus for encoding image information to be coded, including: a tree encoder for grouping predetermined areas having the image information into a plurality of groups, generating a node value of each layer up to an uppermost layer by determining a minimum value or a maximum value of information to be encoded within grouped areas as information on the grouped areas, and encoding a difference value between the node value of each layer and a node value of an upper layer or a difference value between the node value of each layer and a value determined based on a preset criterion; and an additional information encoder for encoding additional information, including information on maximum number of layers, information on number of areas to be grouped, and information on whether the node value of each layer is determined by a minimum value or by a maximum value among node values of a lower layer.

Another embodiment of the present disclosure provides a decoding apparatus for decoding a bit stream to reconstruct information, including: an additional information decoder for decoding the bit stream to reconstruct additional information, including information on maximum number of layers, information on a size of an area of a lowermost layer, and information on whether a node value of each layer is determined by a minimum value or by a maximum value among node values of a lower layer; and a tree decoder for decoding the bit stream by using the additional information to reconstruct a difference value between the node value of each layer and a node value of an upper layer or a difference value between the node value of each layer and a value determined based on a preset criterion, adding the reconstructed difference value to the node value of the upper layer to reconstruct the node value of each layer, and reconstructing a node value of a lowermost layer as information to be decoded.

Yet another embodiment of the present disclosure provides an encoding apparatus for encoding image information to be coded, including: a tree encoder for grouping areas having same information among predetermined areas having the image information, and encoding one or more of a node value and a flag indicating whether or not a node of each layer is divided; and an additional information encoder for encoding additional information, including information on maximum number of layers and information on a size of area indicated by each node of a lowermost layer.

Yet another embodiment of the present disclosure provides a decoding apparatus for decoding a bit stream to reconstruct information, including: an additional information decoder for decoding the bit stream to reconstruct additional information, including information on maximum number of layers and information on a size of area indicated by each node of a lowermost layer; and a tree decoder for decoding the bit stream, based on the additional information, to reconstruct a flag indicating whether or not a node of each layer from an uppermost layer to a lowermost layer is divided, and reconstructing the information by reconstructing a node value of the node of each layer according to the reconstructed flag.

Yet another embodiment of the present disclosure provides an encoding method for encoding image information by using a tree structure, including: forming a tree structure in which each layer includes at least one node, and the node is divided or not divided into the node of the lower layer; encoding a flag for indicating whether or not the node is divided into a node of a lower layer; and encoding additional information, including information on maximum number of layers and information on a size of area indicated by each node of a lowermost layer.

Yet another embodiment of the present disclosure provides a decoding method for reconstructing image information by using a tree structure, including: reconstructing additional information, including information on maximum number of layers constituting the tree structure and information on a size of an area indicated by each node of a lowermost layer; and reconstructing a flag indicating whether or not each node included in each layer is divided, based on the additional information, and reconstructing a node value of the node of each layer according to the reconstructed flag.

Advantageous Effects

According to the present disclosure as described above, the encoding efficiency and in turn the video compression efficiency may be improved by using a tree structure in the encoding of various pieces of image information and the decoding of the resultant encoded data.

DESCRIPTION OF DRAWINGS

FIG. 4 is an exemplary diagram showing bits encoded by using a tree structure according to a first embodiment of the present disclosure;

FIG. 9A shows areas having the information to be encoded within a single picture, FIG. 9B shows the groups of areas having the same information among the areas shown in FIG. 9A.

FIG. 11 is an exemplary diagram showing another scheme for dividing a node into lower layers according to a second embodiment of the present disclosure;

FIGS. 12 and 13 are exemplary diagrams showing grouping when information on areas is distributed in different schemes;

FIG. 14 is a flowchart showing an encoding method using a tree structure according to a second embodiment of the present disclosure;

DETAILED DESCRIPTION

An encoding/decoding method and apparatus using a tree structure according to embodiments of the present disclosure will be described below in detail with reference to the accompanying drawings.

According to the embodiments of the present disclosure, the encoding efficiency is improved by using a tree structure in the encoding of image information to be encoded and the decoding of the resultant encoded data.

According to the embodiments of the present disclosure, the information to be encoded may be information on image signals or various pieces of information used for encoding the image signals, such as macroblock size and macroblock type information of variably sized macroblocks, partition information indicating the size and type of subblocks for prediction and transform, intra prediction information, motion vector, motion vector prediction direction, optimal motion vector prediction candidate, optimal interpolation filters of arbitrarily sized areas, use or non-use of image enhancement filters, reference picture index, quantization matrix index, optimal motion vector precision and transform size information, image pixel information, coded block information or coefficient information indicating whether or not transform coefficient other than zero exists within a predetermined block.

In addition, predetermined areas may be macroblocks of variable sizes, or may be blocks of various pixel sizes, such as 64×64 pixel blocks, 32×32 pixel blocks, 16×16 pixel blocks, 16×32 pixel blocks, or 4×16 pixel blocks. Moreover, the predetermined areas may be areas of various types and sizes, such as blocks from which motion vectors are determined.

According to the embodiments of the present disclosure, the encoding and decoding may be applied to entropy coding and entropy decoding but is not limited thereto and may also be applied to various other encoding and decoding.

Figure 1:
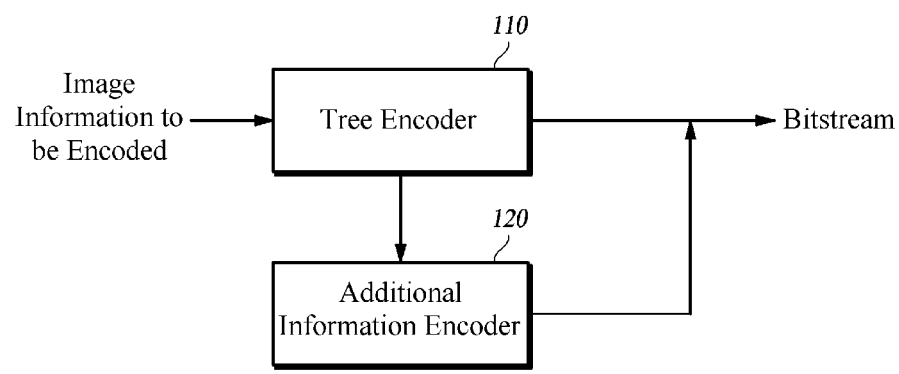
FIG. 1 is a block diagram schematically showing an encoding apparatus using a tree structure according to a first embodiment of the present disclosure.

FIG. 1 is a block diagram schematically showing an encoding apparatus using a tree structure according to a first embodiment of the present disclosure.

An encoding apparatus 100 using a tree structure according to a first embodiment of the present disclosure may include a tree encoder 110 and an additional information encoder 120.

The tree encoder 110 groups predetermined areas having image information to be encoded into a plurality of groups, generates a node value of each layer up to an uppermost layer by determining a minimum value or a maximum value of information to be encoded within grouped areas as information on the grouped areas, and encodes a difference value between the node value of each layer and a node value of an upper layer or a difference value between the node value of each layer and a value determined based on a preset standard.

The term "node value of each layer" means a value of information on areas grouped at each layer. For example, the node value at the lowermost layer may be a value of information on a predetermined area. The node value at an upper layer of the lowermost layer may be a value of information on areas grouped by predetermined areas. The value of the information on the grouped area may be determined by a minimum value or a maximum value among values of information on the predetermined areas included within the grouped area. In addition, the value determined by the preset standard may be a value having the highest occurrence probability in the areas encoded till now among the previous area or adjacent areas, but is not limited thereto, and may be a value determined by various standards.

In this case, the tree encoder 110 may encode the difference value between the node value of each layer and the node value of the upper layer by using various binary coding methods, such as unary code, truncated unary code, and exponential-Golomb (Exp-Golomb) code. Moreover, after binarizing the difference value between the node value of each layer and the node value of the upper layer by using various binary coding methods, such as unary code, truncated unary code, and exponential-Golomb (Exp-Golomb) code, the tree encoder 110 may perform a binary arithmetic coding by determining a probabilistic model for encoding a node value of a layer to be encoded, based on the node value of the adjacent layer or the upper layer, or by changing a probabilistic model at each layer.

In addition, in the event where the node value of each layer is determined by the minimum value among the node values of the lower layer, the tree encoder 110 skips the encoding of a node value of a lower layer than a layer having a maximum node value. That is, in the event where the node value of each layer is determined by the minimum value among the node values of the lower layer, if a certain node value of a certain layer is a maximum value of the information to be encoded, the tree encoder 110 encodes a node value of a corresponding layer, and skips the encoding on the node values of the lower layer on the assumption that all the node values of the lower layer have the same values. On the other hand, in the event where the node value of each layer is determined by the maximum value among the node values of the lower layer, the tree encoder 110 skips the encoding on node values of a lower layer than a layer having a minimum node value. That is, in the event where the node value of each layer is determined by the maximum value among the node values of the lower layer, if a certain node value of a certain layer is a minimum value the information to be encoded can have, the tree encoder 110 encodes a node value of a corresponding layer, and skips the encoding on the node values of the lower layer on the assumption that all the node values of the lower layer have the same values.

Furthermore, in order to perform the encoding according to the occurrence probability of the information to be encoded, the tree encoder 110 may assign a small code number or a large code number according to the occurrence probability by changing a code number assigned to the information to be encoded. In this case, the occurrence probability of the information to be encoded may be calculated by using various occurrence probabilities, such as the occurrence probability of information on a predetermined adjacent area, or the occurrence probability of information on an area encoded till now within an entire or partial area including the information to be encoded.

In the event where the tree encoder 110 encodes the node value of the uppermost layer, the tree encoder 110 may set the node value of the upper layer of the uppermost layer to a predetermined value because the upper layer of the uppermost layer does not exist, and may encode a difference value between the node value of the uppermost layer and the set predetermined value. In this case, the predetermined value set as the node value of the upper layer of the uppermost layer may be set by various values, such as a value having the highest occurrence probability while being encoded till now in an entire or partial area including the information to be encoded, a preset value, and a value having the highest occurrence probability among values of information on predetermined adjacent areas.

The additional information encoder 120 encodes additional information used for encoding the information on the predetermined area by using the tree structure according to the first embodiment of the present disclosure. The additional information may be information on the maximum number of layers, information on the size of area of the lowermost layer, and information on whether the node value of each layer is determined by the minimum value or by the maximum value among the node values of the lower layer. The encoded additional information may be included in a header of a predetermined encoding unit, such as a sequence header, picture header, or slice header of a bit stream.

The process of encoding the information to be encoded by using the tree structure will be described below in detail with reference to FIGS. 2 to 4.

Figure 2:
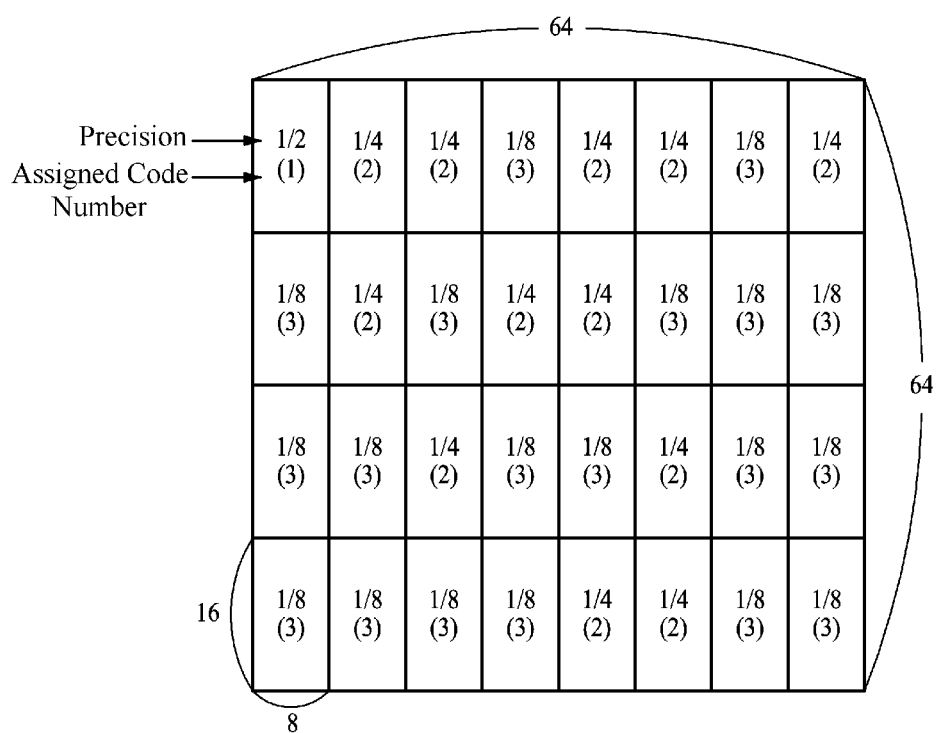
FIG. 2 is an exemplary diagram showing information to be encoded by using a tree structure according to a first embodiment of the present disclosure.

FIG. 2 is an exemplary diagram showing the information to be encoded by using the tree structure according to the first embodiment of the present disclosure and code numbers assigned to the respective pieces of information.

In the case of the inter prediction encoding when an image macroblock is a 64×64 pixel block and is divided into 8×16 pixel subblocks, the motion vector precision determined at each 8×16 pixel subblock is exemplarily shown in FIG. 2. In this case, the information to be encoded is the motion vector precision of a predetermined area, and the predetermined area is an 8×16 pixel subblock.

The encoding may be carried out by using untouched values of data to be encoded, and may also be carried out by assigning code numbers to the data to be encoded. The method for assigning the code numbers may be modified in various manners according to the occurrence probability of data. The embodiment of FIG. 2 shows an example in which code numbers 1, 2 and 3 are assigned to ½ precision, ¼ precision, and ⅛ precision, respectively. The encoding apparatus 100 according to the first embodiment of the present disclosure may determine the node value of each layer by repeating, at each layer, the process of assigning the code numbers to the motion vector precisions shown in FIG. 2, grouping a predetermined number of predetermined areas in order for the encoding using the tree structure as shown in FIG. 3, and determining information on the grouped areas, based on the information included within the grouped areas.

Figure 3:
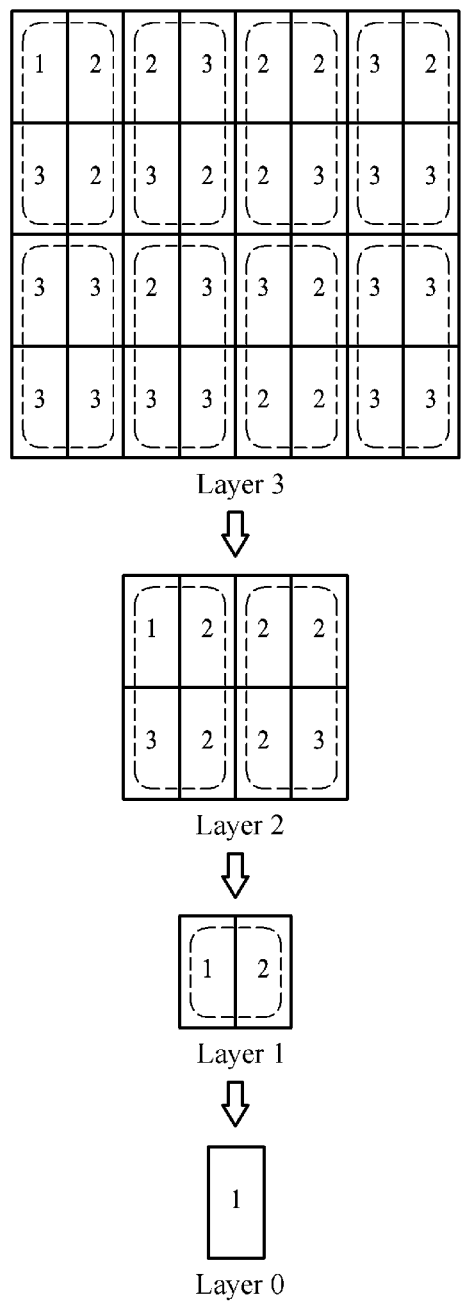
FIG. 3 is an exemplary diagram showing a tag tree of information on areas determined at each layer according to a first embodiment of the present disclosure.

FIG. 3 is an exemplary diagram showing a tag tree of information on areas determined at each layer according to the first embodiment of the present disclosure.

In order for encoding the information to be encoded by using the tree structure as shown in FIG. 2, the video encoding apparatus 100 determines the tree structure as shown in FIG. 3 by repeating, up to the uppermost layer, the process of grouping four 8×16 pixel subblocks and determining the information on the grouped areas by the minimum value of information included within the respective grouped areas.

Thereafter, the video encoding apparatus 100 encodes additional information used for encoding the information based on the tree structure. The additional information may be information on the maximum number of layers in the tree structure, information on the size of area of the lowermost layer, and information on whether the information on areas grouped at each layer is determined by the minimum value or by the maximum value among pieces of information on the areas of the lower layer. Instead of the information on the size of area of the lowermost layer, information on the number of areas to be grouped may be included in the additional information and then be encoded. In FIG. 3, as the additional information, the maximum number of the layers in the tree structure is four, the size of area of the lowermost layer is 8×16 pixels, and the information on areas grouped at each layer is the minimum value of pieces of information on the areas of the lower layer. In this case, instead of encoding the size of area of the lowermost layer as the additional information, "four", the number of the areas to be grouped, may be encoded as the encoding information.

Referring to FIG. 3, since the minimum value of the code numbers assigned to the first four areas of the layer 3 is the code number 1 indicating the ½ precision, the value of the information on the first area of the layer 2 is the code number 1 indicating the ½ precision. In this manner, the tree structure as shown in FIG. 3 is determined by grouping the areas of each layer from the layer 3 to the layer 0 and determining the minimum value of pieces of information on the areas included within the grouped areas as the value of the information on the grouped areas.

If the tree structure as shown in FIG. 3 is determined, the encoding apparatus 100 generates code bits from the upper layer to the lower layer and encodes the generated code bits. Moreover, since the encoding apparatus 100 knows the maximum value of the information to be encoded, the encoding apparatus 100 may generate a binary bit string by using a truncated unary code.

In this case, the method for encoding the node of each layer encodes a difference value from an upper node value, and the method for encoding the difference value encodes a binary bit '0' as many as the difference value and encodes a binary bit '1' at the end. If there is no difference between the value of the current node to be encoded and the value of the upper node, a binary bit '1' is encoded.

More specifically, the method for encoding each node value encodes the difference value between the value of the current node to be encoded and the value of the upper node by using the binary bits '0' and '1', except for the following cases (1) to (3). The binary bit '0' is encoded as many as the difference value only and encodes the binary bit '1' at the end. If there is no difference between the value of the current node to be encoded and the value of the upper node, the binary bit '1' is encoded. Conversely, the binary bit '1' may be encoded as many as the difference value and, if there is no difference between the value of the current node to be encoded and the value of the upper node, the binary bit '0' may be encoded.

Upon encoding each node value, in the event where the value of the upper node is the maximum value the data to be encoded can have, the lower nodes are not encoded because the lower nodes cannot have larger values than the upper node. That is, all the lower nodes have the same value as the code number of the upper node.

Upon encoding the difference value, in the event where the value of the current node is the value of the data to be encoded or the maximum value the code number can have, the binary bit '0' is encoded as many as the difference value from the upper node, and the binary bit '1' indicating the termination of the encoding on the current node is not encoded at the end. For example, the binary bits '00' are encoded if the maximum value the data to be encoded can have is 3 and the value of the upper node is 1, and the value of the current node to be encoded is 3.

Upon encoding the value of the last node among the nodes each having the same upper node, in the event where the values of the nodes other than the last node are larger than the value of the upper node, the value of the last node is not encoded.

Upon encoding the value of the uppermost nodes, the difference value from the value of the data to be encoded or the maximum value the code number can have is encoded by using the above-described binary bits 0 and 1. Moreover, another method for encoding the value of the uppermost node may encode the difference value from the code number or data having the highest occurrence probability.

FIG. 4 is an exemplary diagram showing encoded bits of the motion vector precision of FIG. 2 by using the tree structure according to the first embodiment of the present disclosure.

FIG. 4 shows bits generated by encoding the information on areas of FIG. 2 by using the tree structure and the corresponding areas. The process of encoding the information on areas of FIG. 2 by using the tree structure of FIG. 3 will be described below with reference to FIG. 4. In the following encoding process, the node value means the code number.

In the case of the area (0,0), there is no upper layer in the layer 0 which is the uppermost layer. Assuming that the ½ precision has the highest occurrence probability, the node value of the upper layer is set to 1 (½ precision). Therefore, the difference value between the node value of the uppermost layer and the node value of the upper layer thereof is 0. 0 becomes 1 if expressed as a binary bit string. Since the node value of the area (0,0) in the layer 1 is 1 (½ precision) and the node value of the upper layer is 1 (½ precision), the difference value therebetween is 0. 0 becomes 1 if expressed as a binary bit string. Since the node value of the area (0,0) in the layer 2 is 1 (½ precision) and the node value of the upper layer is 1 (½ precision), the difference value therebetween is 0. 0 becomes 1 if expressed as a binary bit string. Since the node value of the area (0,0) in the layer 3 is 1 (½ precision) and the node value of the upper layer is 1 (½ precision), the difference value therebetween is 0. 0 becomes 1 if expressed as a binary bit string. Therefore, the binary bit string obtained by encoding the information on the area (0,0) among the areas shown in FIG. 1 is 1111.

In the case of the area (0,1), since the node values of the layer 0, the layer 1, and the layer 2 have already been encoded in the process of encoding the node value of the area (0,0), the node values of the layer 0, the layer 1, and the layer 2 are not encoded, and only the node value of the layer 3 is encoded. Since the node value of the area (0,1) in the layer 3 is 2 (¼ precision) and the node value of its upper layer is 1 (½ precision), the difference value between code numbers is 1. 1 becomes 01 if expressed as a binary bit string. Therefore, the binary bit string obtained by encoding the information on the area (0,1) among the areas shown in FIG. 2 is 01.

In the case of the area (0,4), since the node value of the layer 0 has already been encoded in the process of encoding the node value of the area (0,0), the node value of the layer 0 is not encoded, and only the node values of the layer 1, the layer 2, and the layer 3 are encoded. Since the node value of the area (0,1) in the layer 1 is 1 (½ precision) and the node value of its upper layer is 1 (½ precision), the difference value between code numbers is 1. 1 becomes 01 if expressed as a binary bit string. Since the node value of the area (0,2) in the layer 2 is 2 (¼ precision) and the node value of its upper layer is 2 (¼ precision), the difference value between code numbers is 0. 0 becomes 1 if expressed as a binary bit string. Since the node value of the area (0,4) in the layer 3 is 2 (¼ precision) and the node value of the upper layer is 2 (¼ precision), the difference value between code numbers is 0. 0 becomes 1 if expressed as a binary bit string. Therefore, the binary bit string obtained by encoding the information on the area (0,4) among the areas shown in FIG. 1 is 0111.

In the case of the area (2,0), since the node values of the layer 0 and the layer 1 have already been encoded, the node values of the layer 0 and the layer 1 are not encoded, and only the node values of the layer 2 and the layer 3 are encoded. Since the node value of the area (1,0) in the layer 2 is 3 (⅛ precision) and the node value of its upper layer is 1 (½ precision), the difference value between code numbers is the maximum value of 2 and the corresponding node value is 3 (⅛ precision). Therefore, the binary bit string generated by the truncated unary code is 00. Since the maximum value appears, the node values of the lower layer of the corresponding node are not encoded.

Likewise, in the case of the area (2,6), since the node values of the layer 0 and the layer 1 have already been encoded, the node values of the layer 0 and the layer 1 are not encoded, and only the node values of the layer 2 and the layer 3 are encoded. Since the node value of the area (0,1) in the layer 2 is 3 (⅛ precision) and the node value of the upper layer is 2 (¼ precision), the difference value therebetween is 1 and the corresponding node value is 3 (⅛ precision). Therefore, the binary bit string generated by a truncated unary code is 0. In this case, since the maximum value is appeared, the node values of the lower layer are not encoded.

In the case of performing an arithmetic coding, the encoding apparatus 100 generates a probabilistic model by using the binary bit string or information on adjacent areas and performs an arithmetic coding on the generated binary bit string. In the case of performing no arithmetic coding, the encoding apparatus 100 inserts the generated binary bit string into the bit stream.

In this manner, the bit stream is generated by encoding the information exemplarily shown in FIG. 2 by using the tree structure.

Although FIGS. 2 to 4 show an example in which the code numbers 1, 2 and 3 are assigned to the ½ precision, the ¼ precision, and the ⅛ precision and then encoded, different code numbers may be assigned to the different precisions by using the occurrence probability of the information on adjacent areas or the already encoded information.

Figure 5:
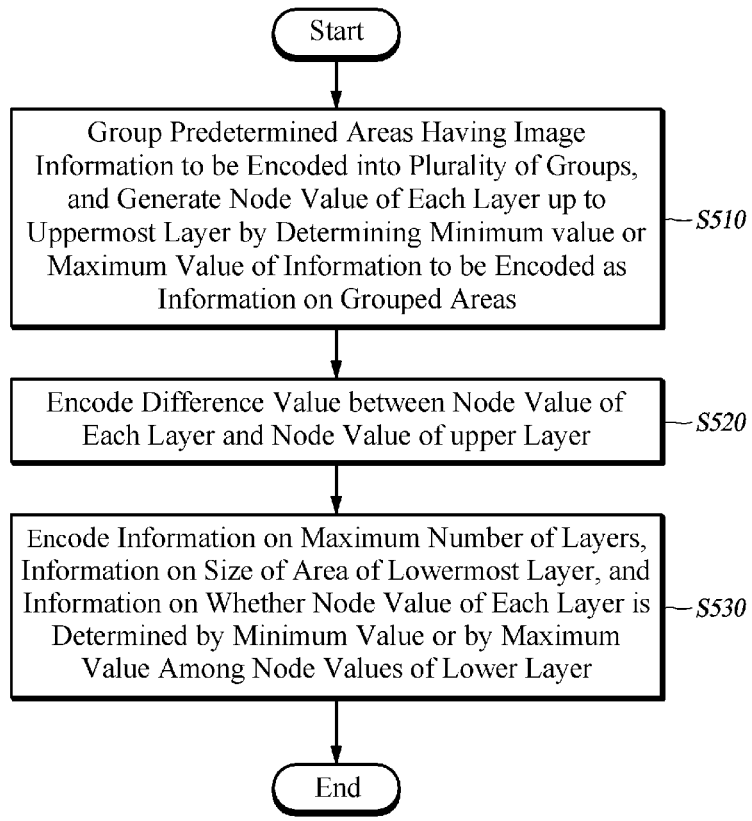
FIG. 5 is a flowchart showing an encoding method using a tree structure according to a first embodiment of the present disclosure.

FIG. 5 is a flowchart showing an encoding method using a tree structure according to a first embodiment of the present disclosure.

As for the encoding method using the tree structure according to the first embodiment of the present disclosure, the encoding apparatus 100 groups predetermined areas having image information to be encoded into a plurality of groups, and generates a node value of each layer up to an uppermost layer by determining a minimum value or a maximum value of information to be encoded within grouped areas as information on the grouped areas (step S510). The encoding apparatus 100 encodes a difference value between the node value of each layer and a node value of an upper layer (step S520). The encoding apparatus 100 encodes additional information, including information on the maximum number of layers, information on the size of area of the lowermost layer, and information on whether the node value for each layer is determined by the minimum value or by the maximum value among the node values of the lower layer (step S530).

The encoding apparatus 100 does not necessarily perform step S530 and may optionally perform step S530 according to an implementation scheme or necessity. For example, in the event where the encoding apparatus 100 and a decoding apparatus, which will be described below, mutually know one or more of the information on the maximum number of layers, the information on the size of area of the lowermost layer, and the information on whether the node value of each layer is determined by the minimum value or by the maximum value among the node values of the lower layer, the encoding apparatus 100 may not encode the mutually known information and encode only mutually unknown information. If all pieces of information are mutually known in agreement and set up, the encoding apparatus 100 may not encode the additional information.

At step S530, the encoding apparatus 100 may insert information on the number of areas to be grouped into the encoding information and encode the encoding information, instead of the information on the size of area of the lowermost layer. This is because, if the maximum number of the layers is determined, the size of area of the lowermost layer determining the number of the areas to be grouped may also be determined.

At step S520, the encoding apparatus 100 may encode the difference value by using a binary coding, or may perform a binary arithmetic coding by encoding the difference value by using the binary coding and then changing a probabilistic model. In this case, the probabilistic model may be determined based on a node value of an adjacent layer or an upper layer, or may be differently changed at each layer.

At step S520, in the event where the node value of each layer is determined by the minimum value among the node values of the lower layer, the encoding apparatus 100 may skip the encoding on a node value of a lower layer of a node having a maximum node value. In the event where the node value of each layer is determined by the maximum value among the node values of the lower layer, the encoding apparatus 100 may skip the encoding on a node value of a lower layer than a layer having a minimum node value.

At step S520, the encoding apparatus 100 may change the code number assigned to the information to be encoded, in order for performing the encoding according to the occurrence probability of the information to be encoded.

At the step S520, in the event where the encoding apparatus encodes the node value of the uppermost layer, the encoding apparatus 100 may set the node value of the upper layer of the uppermost layer to a predetermined value, and encode a difference value between the node value of the uppermost layer and the set predetermined value.

Figure 6:
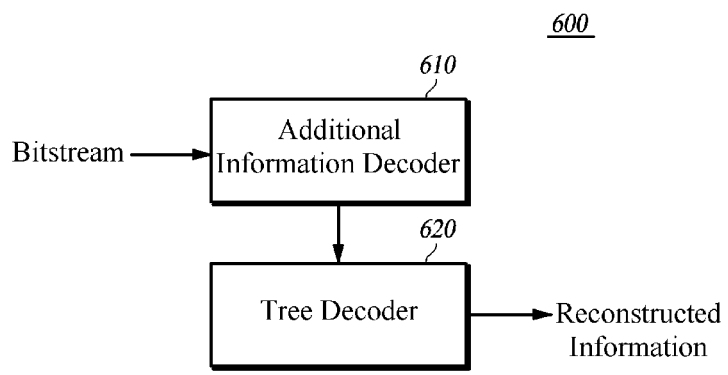
FIG. 6 is a block diagram schematically showing a decoding method using a tree structure according to a first embodiment of the present disclosure.

FIG. 6 is a block diagram schematically showing a decoding apparatus using a tree structure according to a first embodiment of the present disclosure.

The decoding apparatus 600 using the tree structure according to the first embodiment of the present disclosure may include an additional information decoder 610 and a tree decoder 620.

The additional information decoder 610 decodes a bit stream to reconstruct additional information, including information on the maximum number of layers, information on the size of area of the lowermost layer, and information on whether the node value of each layer is determined by the minimum value or by the maximum value among the node values of the lower layer. The tree decoder 620 uses the decoded additional information to reconstruct the tree structure and reconstruct a difference value between the node value of each layer and the node value of the upper layer or a difference value between the node value of each layer and a value determined by a preset standard. In this case, the additional information decoder 610 reconstructs the additional information by extracting data with the encoded additional information from a header of the bit stream and then decoding the extracted data. The header of the bit stream may be a macroblock header, a slice header, a picture header, or a sequence header. The value determined by the preset standard may be a value having the highest occurrence probability in areas decoded thus far among the previous areas or adjacent areas, but is not limited thereto, and may be a value determined by various criteria.

The additional information decoder 610 is not necessarily included in the decoding apparatus 600 and may be optionally included according to an implementation scheme or necessity. For example, in the event where the encoding apparatus 100 and the decoding apparatus 600 mutually know the information on the maximum number of layers, the information on the size of area of the lowermost layer, and the information on whether the node value of each layer is determined by the minimum value or by the maximum value among the node values of the lower layer, the encoding apparatus 100 may not encode the additional information, and accordingly, the decoding apparatus 600 may reconstruct the tree structure by using the preset additional information, without reconstructing the additional information by decoding the bit stream.

The tree decoder 620 decodes the bit stream by using the additional information to reconstruct the difference value between the node value of each layer and the node value of the upper layer or the difference value between the node value of each layer and the value determined by the preset standard. The tree decoder 620 reconstructs the node value of each layer by adding the reconstructed difference value to the node value of the upper layer. The tree decoder 620 reconstructs the node value of the lowermost layer as information to be decoded. That is, the tree decoder 620 reconstructs an enhanced tree structure by using the additional information that is preset or reconstructed by the additional information decoder 610. The tree decoder 620 decodes the bit stream, based on the enhanced tree structure, to reconstruct the difference value between the node value of each layer and the node value of the upper layer. The tree decoder 620 reconstructs the node value of each layer by adding the reconstructed difference value to the node value of the upper layer.

In this case, the tree decoder 620 may reconstruct the difference value between the node value of each layer and the node value of the upper layer by decoding the bit stream by using various binary decoding methods, such as unary code, truncated unary code, and Exp-Golomb code. In addition, after decoding the bit stream by using various binary decoding methods, such as unary code, truncated unary code, and Exp-Golomb code, the tree decoder 620 may perform a binary arithmetic decoding by determining a probabilistic model of a layer to be decoded based on a node value of an adjacent layer or an upper layer. Moreover, the tree decoder 620 may perform an arithmetic decoding on the bit stream by differently changing a probabilistic model at each layer.

In the event where it is identified that the encoding apparatus 100 determines the node value of each layer by the minimum value among the node values of the lower layer, based on the additional information, the tree decoder 620 skips the decoding on the node values of the lower layer than the layer having the maximum node value on the assumption that all the node values of the lower layer have the same value. On the other hand, in the event where it is identified that the encoding apparatus 100 determines the node value of each layer by the maximum value among the node values of the lower layer, based on the additional information, the tree decoder 620 skips the decoding on the node values of the lower layer than the layer having the minimum node value on the assumption that all the node values of the lower layer have the same value.

The tree decoder 620 may differently change the code numbers according to the occurrence probability of the information to be decoded. That is, the tree decoder 620 may assign a small code number or a large code number according to the occurrence probability of the information to be decoded. The occurrence probability of the information to be decoded may be calculated by using various methods, such as the occurrence probability of information on predetermined adjacent areas, or the occurrence probability of information that has already been decoded and reconstructed prior to the area having the information to be decoded.

In the event where the tree decoder 620 reconstructs the difference value between the node value of the uppermost layer and the node value of the upper layer thereof, the tree decoder 620 reconstructs only the difference value on the assumption that the node value of the upper layer of the uppermost layer has a predetermined value because the upper layer than the uppermost layer does not exist. In this case, the predetermined value may be anyone among a value having the highest occurrence probability while being decoded thus far, a preset value, a value having the highest occurrence probability among values of information on predetermined adjacent areas, and the like.

The process of reconstructing information by decoding the bit stream by using the tree structure according to the first embodiment of the present disclosure will be described below in detail with reference to FIGS. 2 to 4.

The decoding apparatus 600 extracts data with the encoded additional information from the picture header, slice header, or macroblock header of the bit stream, and reconstructs the additional information by decoding the extracted data. In addition, the decoding apparatus 600 may use preset additional information. The additional information may include information on the maximum number of layers, information on the size of area of the lowermost layer, and information on whether the node value of each layer is determined by the minimum value or by the maximum value among the node values of the lower layer. The decoding apparatus 600 may reconstruct the tree structure as shown in FIG. 3 by using the information on the maximum number of the layers and the information on the size of area of the lowermost layer among the additional information. In this case, the decoding apparatus 600 may reconstruct the tree structure by using the information on the number of areas to be grouped, instead of the information on the size of area of the lowermost layer. Moreover, the decoding apparatus 600 may reconstruct the tree structure by using both the information on the size of area of the lowermost layer and the information on the number of the areas to be grouped.

If the tree structure as shown in FIG. 3 is reconstructed, the decoding apparatus 600 uses the reconstructed tree structure to decode the bit stream, in which the difference value between the node value of each layer and the node value of the upper layer is encoded, as described above with reference to FIG. 4.

Since the decoding apparatus 600 already knows the maximum value of the information to be decoded, the decoding apparatus 600 decodes the binary bit string by using a truncated unary code. In this case, it may be assumed that the code numbers of the ½ precision, the ¼ precision, and the ⅛ precision are 1, 2 and 3, respectively. The code number of each precision may be differently changed according to the occurrence probability of each precision. If the decoding apparatus 600 performs an arithmetic decoding of the binary bit string, the decoding apparatus 600 generates a probabilistic model by using the information on adjacent areas or the binary bit string, and generates a binary bit stream by an arithmetic decoding of a next bit stream. If the decoding apparatus 600 does not perform an arithmetic decoding of the binary bit string, the decoding apparatus 600 generates a binary bit string by decoding the bit stream.

Referring to FIG. 4, in the case of the area (0,0), the uppermost layer of the layer 0 has no upper layer thereof. Assuming that the node value of the upper layer has the ½ precision (the highest occurrence probability), if the binary bit string 1 is decoded, the difference value between the node value of the uppermost layer and the node value of the upper layer thereof is 0. In the layer 1, if the binary bit string 1 is decoded, the difference value from the node value of the upper layer thereof is 0. In the layer 2, if the binary bit string 1 is decoded, the difference value from the node value of the upper layer thereof is 0. In the layer 3, if the binary bit string 1 is decoded, the difference value from the node value of the upper layer thereof is 0. If adding the node value of each upper layer to the difference value between the node value of each layer and the node value of the upper layer thereof, the node value of each layer is 1, that is, the ½ precision. Therefore, the reconstructed information of the area (0,0) is the ½ precision.

In the case of the area (0,1), since the layer 0, the layer 1, and the layer 2 have already been decoded in the process of reconstructing the information on the area (0,0), no additional decoding is carried out thereon. In the layer 3, if the binary bit string 01 is decoded, the difference value from the node value of the upper layer thereof is 1. Therefore, the reconstructed information of the area (0,1) is 2, which means the ¼ precision.

In the case of the area (2,0), since the layer 0 and the layer 1 have already been decoded in the process of reconstructing the information on the area (0,0), no additional decoding is carried out thereon. In the layer 2, since the node value of the upper layer is 1 (½ precision), it can be known that the difference value from the node value of the upper layer is the maximum value, that is, 2. Therefore, if the binary bit string 00 is decoded by a truncated unary code, the reconstructed information of the area (2,0) is the ⅛ precision.

Likewise, in the case of the area (2,6), since the upper layer in the layer 2 is the ¼ precision, it can be known that the maximum value of the difference value is 1. If the binary bit stream 0 is decoded by a truncated unary code, the difference value from the upper layer is 1 and the reconstructed information of the area (2,6) is the ⅛ precision. In this case, since the maximum value is appeared, the node value of the lower layer is not decoded and is determined as the ⅛ precision.

In the above-described example, the decoding is carried out on the assumption that the code numbers 1, 2 and 3 are assigned to the ½ precision, the ¼ precision, and the ⅛ precision, respectively. However, the code numbers may be differently changed at each precision by using the information on adjacent areas or the occurrence probability of the decoded and reconstructed information.

Figure 7:
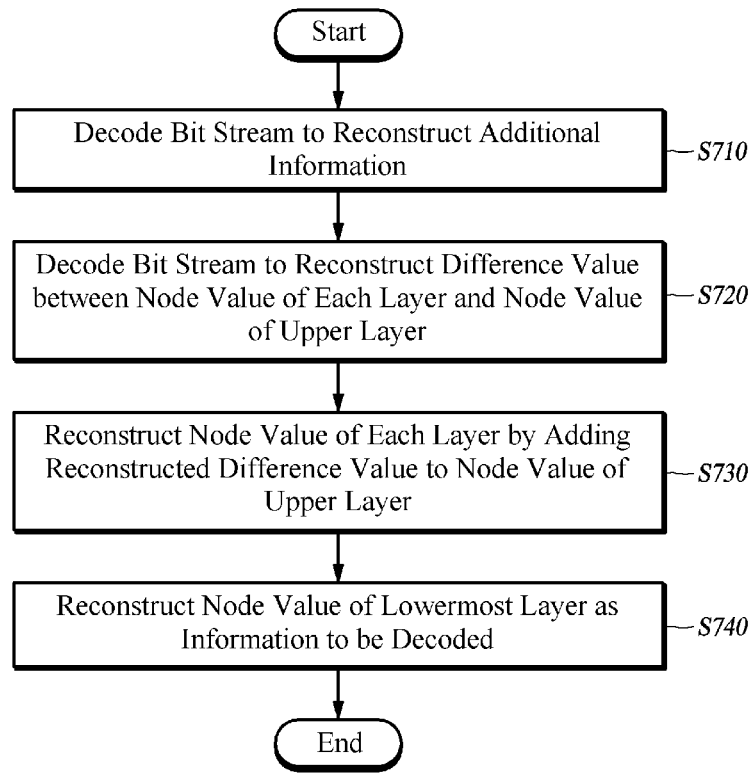
FIG. 7 is a flowchart showing a decoding method using a tree structure according to a first embodiment of the present disclosure.

FIG. 7 is a flowchart showing a decoding method using a tree structure according to a first embodiment of the present disclosure.

As for the decoding method using the tree structure according to the first embodiment of the present disclosure, the decoding apparatus 600 decodes a bit stream to reconstruct additional information (step S710). That is, the decoding apparatus 600 extracts data with the encoded additional information from a header of a predetermined encoding unit, such as a picture header, slice header, or macroblock header of the bit stream, and reconstructs the additional information by decoding the extracted data. The additional information may include information on the maximum number of layers, information on the size of area of the lowermost layer, and information on whether the node value of each layer is determined by the minimum value or by the maximum value among the node values of the lower layer.

The decoding apparatus 600 does not necessarily perform step S710 and may optionally perform step S710 according to an implementation scheme or necessity. For example, in the event where the encoding apparatus 100 and the decoding apparatus 600 in mutual agreement preset all pieces of information included in the additional information, the encoding apparatus 100 may not encode the additional information, and accordingly, the decoding apparatus 600 may decode the bit stream by using preset additional information. In the event where just part of information included in the additional information is set by a prearrangement between the encoding apparatus 100 and the decoding apparatus 600, the encoding apparatus 100 may encode only the mutually unknown information, and the decoding apparatus 600 may decode the bit stream to reconstruct only the mutually unknown information. The reconstructed information and preset other information may be used for the decoding.

The decoding apparatus 600 decodes the bit stream to reconstruct the difference value between the node value of each layer and the node value of the upper layer (step S720). That is, the decoding apparatus 600 reconstructs an enhanced tree structure by using the additional information reconstructed at step S710 or the preset additional information, and reconstructs the difference value between the node value of each layer and the node value of the upper layer by decoding the bit stream by using the reconstructed enhanced tree structure.

The decoding apparatus 600 reconstructs the node value of each layer by adding the reconstructed difference value to the node value of the upper layer (step S730), and reconstructs the node value of the lowermost layer as the information to be decoded (step S740).

At step S720, the decoding apparatus 600 may reconstruct the node value of each layer by decoding the bit stream by using the binary decoding method, or may reconstruct the node value of each layer by decoding the bit stream by using the binary decoding method and then performing a binary arithmetic decoding by changing a probabilistic model. The probabilistic model may be determined based on a node value of an adjacent layer or an upper layer, or may be differently changed at each layer.

At step S720, the decoding apparatus 600 may change the code numbers assigned to the information to be decoded, in order for decoding according to the occurrence probability of the information to be decoded.

At step S730, in the event where it is identified that the node value of each layer is determined by the minimum value among the node values of the lower layer, the decoding apparatus 600 may reconstruct all the node values of the lower layer than the layer having the maximum node value by the maximum value.

At step S730, in the event where it is identified that the node value of each layer is determined by the maximum value among the node values of the lower layer, the decoding apparatus 600 may reconstruct all the node values of the lower layer than the layer having the minimum node value by the minimum value.

At step S730, upon decoding the node value of the uppermost layer, the decoding apparatus 600 may reconstruct the node value of the uppermost layer by setting the node value of the upper layer of the uppermost layer to a predetermined value.

As described above, according to the first embodiment of the present disclosure, the compression efficiency may be improved by efficiently coding the image information to be coded by using the tree structure.

Figure 8:
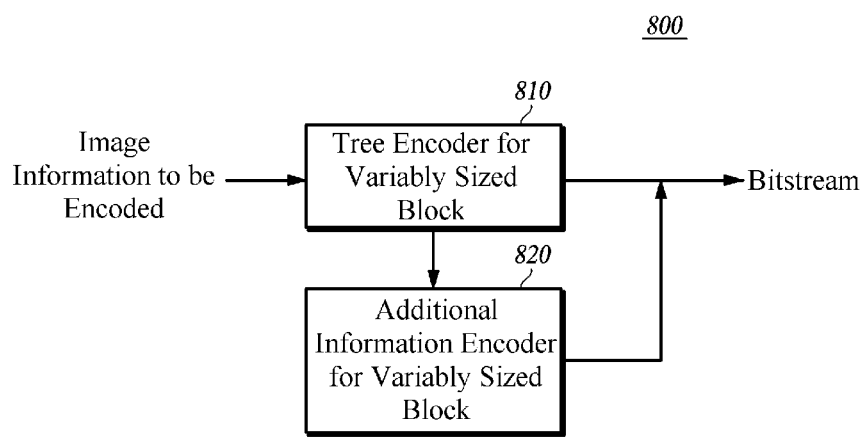
FIG. 8 is a block diagram schematically showing an encoding apparatus using a tree structure according to a second embodiment of the present disclosure.

FIG. 8 is a block diagram schematically showing an encoding apparatus using a tree structure according to a second embodiment of the present disclosure.

The encoding apparatus 800 using the tree structure according to the second embodiment of the present disclosure may include a tree encoder 810 and an additional information encoder 820 both for variably sized blocks.

The tree encoder 810 for the variably sized block groups areas having the same information among predetermined areas having the image information to be encoded, and encodes one or more of a node value and a flag for indicating whether or not a node of each layer is divided.

The additional information encoder 820 for the variably sized block encodes additional information, including information on the maximum number of layers in the tree structure according to the second embodiment and information on the size of area indicated by each node of the lowermost layer. The encoded additional information is included in a header of a bit stream. The header of the bit stream may be a sequence header, a picture header, a slice header, a macroblock header, and the like.

The process of encoding the information to be encoded by using the tree structure will be described below in detail with reference to FIGS. 9 and 10.

Figure 9C:
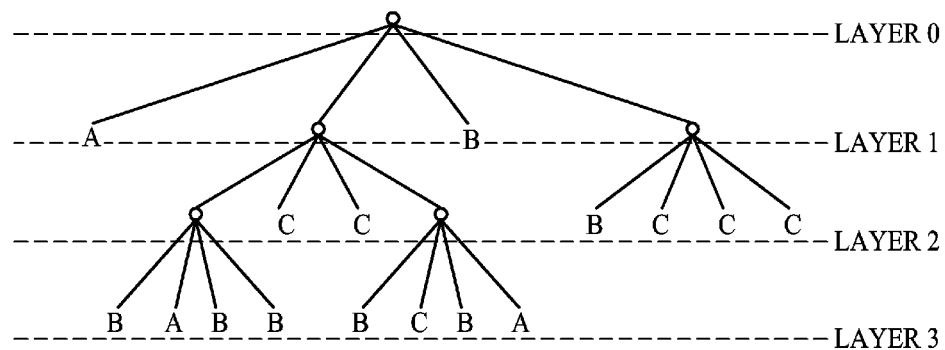
FIG. 9C shows the tree structure of information on the areas grouped as shown in FIG. 9B.

FIGS. 9A to 9C are an exemplary diagram showing the tree structure according to the second embodiment of the present disclosure.

FIG. 9A shows areas having the information to be encoded within a single picture. In FIG. 9A, each area may be a 16×16 pixel macroblock. A, B and C, which are indicated within each area, represent information to be encoded in each area. Such information may be a motion vector precision, but is not limited thereto, and may be various pieces of information, such as partition type information, intra prediction mode, or coefficient information. In the second embodiment, although each area is assumed to be a 16×16 pixel macroblock, the area may also be various blocks, such as a 64×64 pixel block, a 32×32 pixel block, a 16×32 pixel block, a 16×16 pixel block, a 16×8 pixel block, an 8×8 pixel bock, an 8×4 pixel block, a 4×8 pixel block, or a 4×4 pixel block. Moreover, each area may have a different size.

FIG. 9B shows the groups of areas having the same information among the areas shown in FIG. 9A. FIG. 9C shows the tree structure of information on the areas grouped as shown in FIG. 9B. In FIG. 9C, the area indicated by the lowermost node is a 16×16 macroblock, and the maximum number of layers in the tree structure is four. Therefore, such additional information is encoded and then included in a header of a relevant area.

Figure 10:
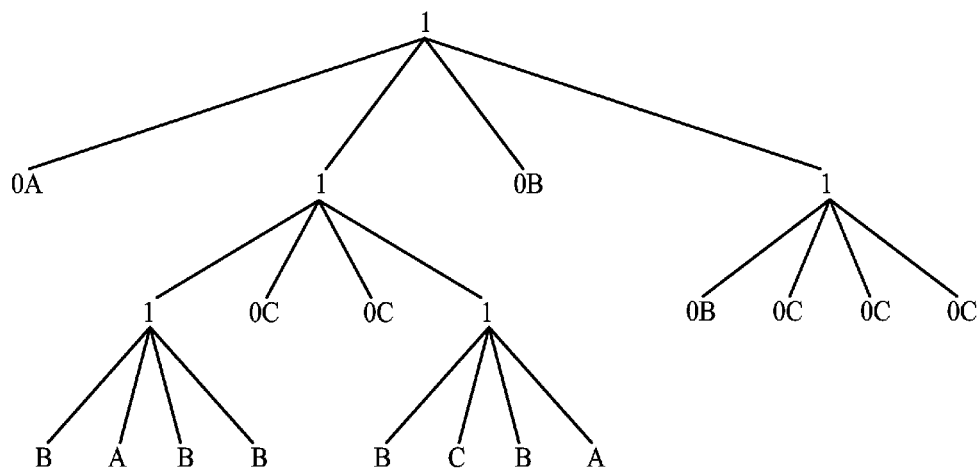
FIG. 10 is an exemplary diagram showing the encoding results of information expressed as a tree structure according to a second embodiment of the present disclosure.

FIG. 10 is an exemplary diagram showing the encoding results of information expressed as the tree structure according to the second embodiment of the present disclosure.

If encoding the information of the tree structure shown in FIG. 9C, a final bit stream may be obtained as shown in FIG. 10. Whether or not a node is divided into nodes of a lower layer is encoded by a single bit. For example, a bit value '1' represents that the current node is divided into the nodes of the lower layer, and a bit value '0' represents that the current node is not divided into the nodes of the lower layer. In the case of the node of the lowermost layer, whether or not the node is divided into the nodes of the lower layer is not encoded, and the node values of the node of the lowermost layer are encoded.

In FIG. 9C, since the node of the layer 0 is divided into the nodes of the lower layer, the node of the layer 0 is encoded by a bit value '1'. Since the node value of the first node of the divided layer 1 is A and the first node is not divided into the nodes of the lower layer any more, the first node is encoded by a bit value '0' and the node value A is encoded. Since the second node of the layer 1 is divided into the nodes of the lower layer, the second node is encoded by a bit value '1'. Since the third node of the layer 1 is not divided into the nodes of the lower layer, the third node is encoded by a bit value '0' and the node value B is encoded. Since the last fourth node of the layer 1 is divided into the nodes of the lower layer, the last fourth layer is encoded by a bit value '1'. In the same manner, each node of the layer 2 is encoded. In the layer 3, the maximum number of layers is designated as four in the header. Therefore, since it can be known that there are no more nodes of the lower layer, only each node value is encoded.

Figures 11, 12:
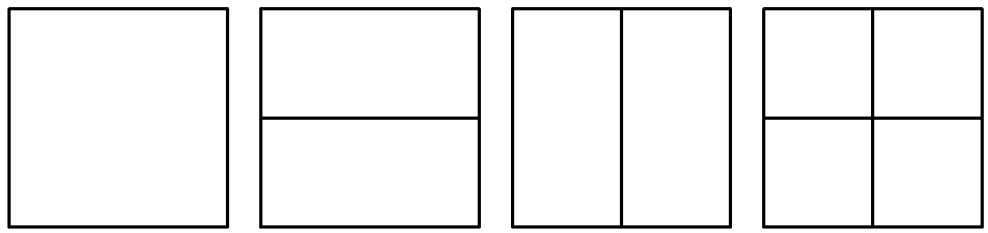

Although each node value is indicated by A, B and C for convenience sake, each node value is expressed as binary bits. Furthermore, the example of FIG. 9C shows only two cases: a first case where the node is divided into the nodes of the lower layer; and a second case where the node is not divided into the nodes of the lower layer. In this embodiment, in the case where the node is divided into the nodes of the lower layer, the node is divided into four nodes. Referring to FIG. 9C, the division of the node into the four nodes of the lower layer means that the area corresponding to the node of the current layer is divided into four equal sub-areas. Alternatively, as shown in FIG. 11, the node may be divided into the nodes of the lower layer in various forms. For example, the node may not be divided into the nodes of the lower layer. The node may be divided into the nodes of the lower layer in the form of two horizontally divided areas. The node may be divided into the nodes of the lower layer in the form of two vertically divided areas. The node may be divided into the nodes of the lower layer in the form of four areas. In this case, information indicating the four division types is transmitted to the decoding apparatus.

If the grouped area is not large, the encoding apparatus 800 may reduce the amount of bits for indicating that there exist the nodes of the lower layer, by encoding a flag indicating that the node of the upper layer is divided into nodes of a specific layer. For example, in the event where the maximum number of layers is designated as four in the header of the bit stream, and the information to be encoded is distributed as shown in FIG. 12, the areas shown in FIG. 12 may be expressed by grouping areas having the same information as shown in FIG. 13. In this case, the encoding apparatus 800 may encode the flag indicating that the node of the uppermost layer is divided into the nodes of the layer 2 or the layer 3. Therefore, the number of flags indicating that the node of the upper layer is divided into the nodes of the lower layer can be reduced, leading to a reduction in the amount of bits.

FIG. 14 is a flowchart showing an encoding method using a tree structure according to a second embodiment of the present disclosure.

As for the encoding method using the tree structure according to the second embodiment of the present disclosure, the encoding apparatus 800 groups areas having the same information among predetermined areas having information to be encoded, and encodes one or more of a node value and a flag indicating whether or not each node of each layer is divided (step S1410), and encodes additional information, including information on the maximum number of layers and information on the size of area indicated by each node of the lowermost layer (step S1420).

At step S1410, if the node is divided, the encoding apparatus 800 may encode a flag indicating the division of the node. That is, the encoding apparatus 800 may determine whether or not the node of each layer is divided. If the node is divided, the encoding apparatus 800 may encode only the flag indicating that the corresponding node is divided into the nodes of the lower layer, without encoding the corresponding node value.

At step S1410, if the node is not divided, the encoding apparatus 800 may encode the node value of the node and the flag indicating that the node is not divided. That is, the encoding apparatus 800 may determine whether or not the node of each layer is divided. If the node is not divided, the encoding apparatus 800 may encode the node value of the corresponding node as well as the flag indicating that the corresponding node is not divided into the nodes of the lower layer. The term "node value of the node" means the information possessed by the node. If areas having the same information are grouped into a single node, the same information is the node value.

At step S1410, if the node is the node of the lowermost layer, the encoding apparatus 800 may encode only the node value of the corresponding node. That is, the encoding apparatus 800 may determine whether or not the node to be encoded is the lowermost layer, prior to determining whether or not the node of each layer is divided. If the corresponding node is the lowermost layer, the encoding apparatus 800 may encode only the node value of the corresponding node, without encoding the flag indicating whether or not the corresponding node is divided.

At step S1420, the encoding apparatus 800 may insert data with encoded additional information into the header of the bit stream. The header of the bit stream may be a header of various encoding units, such as a sequence header, a picture header, a slice header, or a macroblock header.

At step S1410, upon encoding the flag indicating that the node is divided, the encoding apparatus 800 may encode a flag indicating that the node is directly divided into nodes of one or more lower layers. That is, upon encoding the flag indicating whether or not the node is divided, if the corresponding node is divided into the nodes of the lower layer, the encoding apparatus 800 may encode the flag indicating that the corresponding node is subdivided to just a single layer down and may also encode the flag indicating that the corresponding node is divided into the nodes of two or more lower layers.

Figure 15:
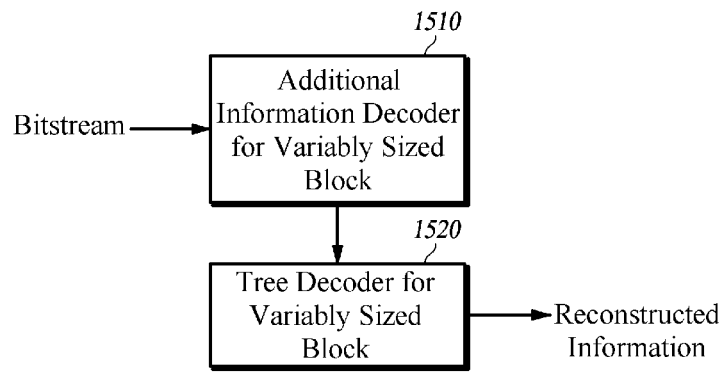
FIG. 15 is a block diagram schematically showing a decoding apparatus using a tree structure according to a second embodiment of the present disclosure.

FIG. 15 is a block diagram schematically showing a decoding apparatus using a tree structure according to a second embodiment of the present disclosure.

The decoding apparatus 1500 using the tree structure according to the second embodiment of the present disclosure may include an additional information decoder 1510 and a tree decoder 1520 both for variably sized blocks.

The additional information decoder 1510 for the variably sized blocks decodes a bit stream to reconstruct additional information, including information on the maximum number of layers and information on the size of area indicated by each node of the lowermost layer. The tree decoder 1520 for the variably sized block uses the reconstructed additional information to reconstruct the tree structure. In this case, the additional information decoder 1510 for the variably sized block extracts data with encoded additional information from a header of the bit stream, and decodes the extracted data to reconstruct the additional information. The header of the bit stream may be a macroblock header, a slice header, a picture header, a sequence header, and the like.

However, the additional information decoder 1510 for the variably sized block is not necessarily included in the decoding apparatus 1500, and may be optionally included according to an implementation scheme or necessity. For example, in the event where the encoding apparatus 800 and the decoding apparatus 1500 are in previous mutual agreement on the maximum number of layers and the size of the area indicated by each node of the lowermost layer, the encoding apparatus 800 may not encode the additional information. Accordingly, the decoding apparatus 1500 also may not reconstruct the additional information by decoding the bit stream, but may reconstruct the tree structure by using preset additional information.

The tree decoder 1520 for the variably sized block decodes the bit stream, based on the additional information, to reconstruct the flag indicating whether or not the node of each layer from the uppermost layer to the lowermost layer is divided, and reconstructs the information by reconstructing the node values of the nodes of each layer according to the reconstructed flag. That is, the tree decoder 1520 for the variably sized block decodes the bit stream, based on the additional information reconstructed by the additional information decoder 1510 for the variably sized block or the preset additional information. The tree decoder 1520 for the variably sized block determines whether or not the node of each layer from the uppermost layer to the lowermost layer is divided. If not divided, the tree decoder 1520 for the variably sized block reconstructs the tree structure by reconstructing the node value of the node, and reconstructs the information to be decoded, based on the reconstructed tree structure.

The following description will be provided with reference to FIGS. 9 and 10 on the process of reconstructing information by the decoding apparatus 1500 through decoding the bit stream by using the tree structure according to the second embodiment of the present disclosure.

The decoding apparatus 1500 extracts encoded additional information from a macroblock header, slice header, picture header, or sequence header of the bit stream, and decodes the extracted additional information to reconstruct the additional information. The additional information includes information on the maximum number of layers in the tree structure, and information on the size of area indicated by each node of the lowermost layer.

The decoding apparatus 1500 extracts a bit string, such as the final bits of FIG. 10, from the bit stream. Then, as described above, the decoding apparatus 1500 reconstructs the tree structure based on the reconstructed additional information and the extracted bit string, as exemplarily shown in FIG. 10.

For example, the decoding apparatus 1500 sequentially reads the bit values from the bit string of the final bits extracted from the bit stream, and reconstructs the flag indicating whether or not the node of each layer from the uppermost layer to the lowermost layer is divided into the nodes of the lower layer. If the reconstruct flag indicates that the node is not divided into the nodes of the lower layer, the decoding apparatus 1500 reads a next bit string and reconstructs the node value of the corresponding node. The reconstructed node value is information to be decoded. In addition, if the reconstructed flag indicates that the node is divided into the nodes of the lower layer, the decoding apparatus 1500 reads a next bit value and reconstructs the flag indicating whether or not the next node or a next node after a next layer is divided into the nodes of the lower layer. In this manner, the decoding apparatus 1500 sequentially reads the bit string and reconstructs information up to the lowermost layer. Meanwhile, with regard to the node of the lowermost layer, the decoding apparatus 1500 does not reconstruct the flag indicating whether or not the node is divided, and reconstructs only the node value of each node.

In the event where the node is divided into the nodes of the lower layer, the node is divided into four nodes, as exemplarily shown in FIG. 9C. Referring to FIG. 9C, the division of the node into the four nodes of the lower layer means that the area corresponding to the node of the current layer is divided into four equal sub-areas. Alternatively, as shown in FIG. 11, the node may be divided into the nodes of the lower layer in various forms. For example, the node may not be divided into the nodes of the lower layer. The node may be divided into the nodes of the lower layer in the form of two horizontally divided areas. The node may be divided into the nodes of the lower layer in the form of two vertically divided areas. The node may be divided into the nodes of the lower layer in the form of four areas. In this case, information indicating the four division types is transmitted from the encoding apparatus to the decoding apparatus 1500.

In this manner, the decoding apparatus 1500 reconstructs the tree structure as shown in FIG. 9C by reconstructing the information from the uppermost layer to the lowermost layer, and reconstructs the information on each area shown in FIGS. 9B and 9A, based on the reconstructed tree structure.

If the flag reconstructed by extracting data from the bit string of the bit stream and decoding the extracted data indicates that the node of a certain layer is directly divided into nodes of two or more lower layers, the decoding apparatus 1500 skips the decoding on the layer between the indicated layers, and decodes one or more of the node value of the corresponding node and the flag indicating whether or not the node of the indicated lower layer is divided.

Figure 16:
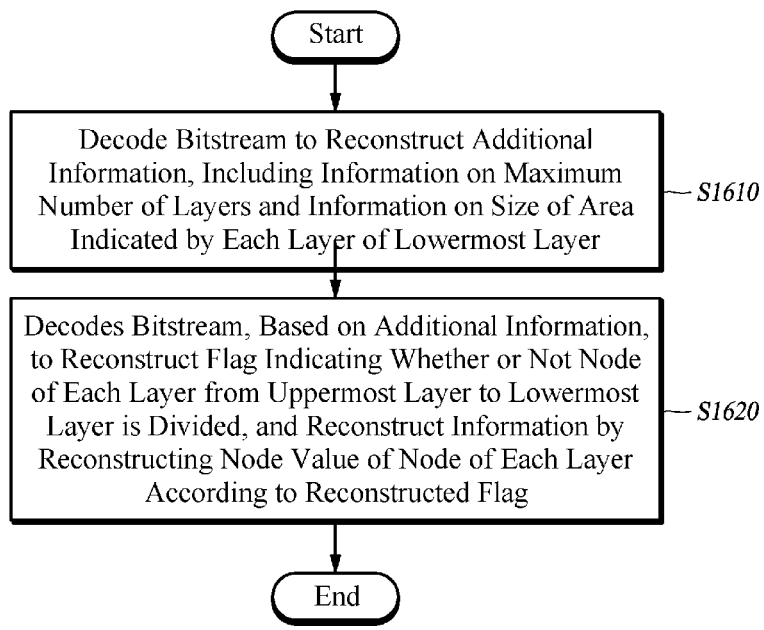
FIG. 16 is a flowchart showing a decoding method using a tree structure according to a second embodiment of the present disclosure.

FIG. 16 is a flowchart showing a decoding method using a tree structure according to a second embodiment of the present disclosure.

As for the decoding method using the tree structure according to the second embodiment of the present disclosure, the decoding apparatus 1500 decodes the bit stream to reconstruct additional information, including information on the maximum number of layers and information on the size of area indicated by each node of the lowermost layer (step S1610). The decoding apparatus 1500 decodes the bit string extracted from the bit stream, based on the additional information, to reconstruct the flag indicating whether or not the node of each layer from the uppermost layer to the lowermost layer is divided, and reconstructs information by reconstructing the node value of the node of each layer according to the reconstructed flag (step S1620).

At step S1620, if the flag indicates that the node is not divided into the nodes of the lower layer, the decoding apparatus 150 may reconstruct the node value of the node. That is, the decoding apparatus 1500 reconstructs the flag indicating whether or not the node of each layer is divided, decodes a next node if the reconstructed flag indicates that the node of the corresponding node is divided into the nodes of the lower layer, and reconstructs the node value of the corresponding node only when the reconstructed flag indicates that the node of the corresponding node is not divided into the nodes of the lower layer.

In the event where the node is divided into the nodes of the lower layer, the node is divided into four nodes, as exemplarily shown in FIG. 9C. Alternatively, as shown in FIG. 11, the node may be divided into the nodes of the lower layer in various forms. For example, the node may not be divided into the nodes of the lower layer. The node may be divided into the nodes of the lower layer in the form of two horizontally divided areas. The node may be divided into the nodes of the lower layer in the form of two vertically divided areas. The node may be divided into the nodes of the lower layer in the form of four areas. In this case, information indicating the four division types is transmitted to the decoding apparatus 1500.

At step S1620, the decoding apparatus 1500 may reconstruct only the node value of each node of the lowermost layer. That is, the decoding apparatus 1500 determines in advance whether or not the node to be decoded is included in the lowermost layer in the process of reconstructing the flag for indicating whether or not the node of each layer is divided and/or the node value of the node. If the node to be decoded is included in the lowermost layer, the decoding apparatus 1500 reconstructs only the node value of the corresponding node, without reconstructing the flag indicating whether or not the corresponding node is divided.

In the encoding/decoding method using the tree structure according to the embodiments of the present disclosure, the information to be encoded and decoded is not limited to the data suggested in the embodiments but may be applied to the encoding and decoding of a variety of information suggested in the following.

The information to be encoded may include information on image signals or various pieces of information used for encoding the image signals, such as macroblock size and macroblock type information, macroblock partition information indicating the size and type of subblocks for prediction and transform, intra prediction information, motion vector, motion vector prediction direction, optimal motion vector prediction candidates, optimal interpolation filters of arbitrarily sized areas, use or non-use of image enhancement filters, reference picture index, quantization matrix index, optimal motion vector precision and transform size information, image pixel information, coded block information or coefficient information indicating whether or not transform coefficient other than zero exists within a predetermined block.

In the embodiment of the present disclosure, the macroblock has variable sizes as a default unit of video encoding and decoding. The macroblock size information may be encoded by using the tree structure according to the embodiment of the present disclosure. To this end, the encoding apparatus according to the embodiment of the present disclosure generates information on the maximum size and minimum size of the macroblock, information on the maximum number of layers constituting the tree, and the macroblock division partition flag, and transmits the generated information to the decoding apparatus. The information on the maximum size and minimum size of the macroblock and the information on the maximum number of the layers constituting the tree may be included in the bit stream as the header information of the sequence, group of pictures (GOP), picture, slice, and the like.

As shown in FIG. 9C or 10, the macroblock division flag may be encoded by using the tree structure and included in the header of the encoding unit. In other words, the information encoded and decoded by using the tree structure according to the embodiment of the present disclosure is the above-described macroblock division flag.

The maximum and minimum sizes of macroblocks may be set with the horizontal and vertical sizes determined separately so as to permit use of arbitrarily sized macroblocks. Furthermore, the maximum and minimum sizes of the macroblocks to be encoded may be assigned actual sizes, or a magnification ratio may be transmitted for instructing to multiply or reduce a predetermined size by certain times. To encode the magnification ratio for generating the maximum macroblock size through multiplying the predetermined size by the certain times which are selected to be 16, the value of $\log_2$ (selected MBsize/16) is encoded. For example, if the macroblock size is 16×16, 0 is encoded. If the macroblock size is 32×32, 1 is encoded. Moreover, the ratios of the horizontal and vertical sizes may be separately encoded.

Alternatively, after encoding the maximum macroblock size value through the above-described method, the minimum size value of the macroblock may be encoded by using the value of $\log_2$ (maximum macroblock size/minimum macroblock size) indicating the ratio of the maximum macroblock size to the minimum macroblock size. On the contrary, after encoding the minimum block size value through the above-described method, the maximum macroblock size value may be encoded by using the value of $\log_2$ (maximum macroblock size/minimum macroblock size).

Moreover, according to an embodiment of the present disclosure, the macroblock partition information may be encoded and decoded by using the tree structure according to the present disclosure. The macroblock partition information may include information on the maximum size and minimum size of the subblock for prediction and/or transform, information on the maximum number of layers constituting the tree, and the macroblock partition division flag, as information related to the size and/or type of subblocks (that is, macroblock partitions) for prediction and/or transform. The encoding apparatus according to the embodiment of the present disclosure transmits the macroblock partition information to the decoding apparatus.

The maximum and minimum sizes of the subblock for prediction and/or transform may be determined in units of an entire picture sequence, GOP, picture, or slice. The information on the maximum and minimum sizes of the subblock for prediction and/or transform and the information on the maximum number of layers constituting the tree may be included in the bit stream as the header information of the sequence, GOP, picture, or slice.

On the other hand, macroblock partition division flag among the macroblock partition information may be encoded by using the tree structure according to the embodiment of the present disclosure. The macroblock partition division flag may be included in the header of the macroblock or the header of the macroblock partition corresponding to the encoding unit.

Moreover, with regard to the subblock size for prediction and/or transform, that is, prediction and/or transform size information, the horizontal and vertical sizes of the maximum and minimum prediction and/or transform size may be separately set. Therefore, prediction and/or transform having arbitrary sizes may be used. Additionally, the maximum and minimum sizes of the available prediction and/or transform may be assigned actual sizes, or a magnification ratio may be transmitted for instructing to multiply or reduce a predetermined size by certain times. To encode the magnification ratio for generating the maximum prediction and/or transform size through multiplying the predetermined size by the certain times which are selected to be 4, the value of $\log_2$ (selected prediction and/or transform/4) is encoded. For example, if the prediction and/or transform size is 4×4, 0 is encoded. If the prediction and/or transform size is 8×8, 1 is encoded. Moreover, the ratios of the horizontal and vertical sizes may be separately encoded.

Alternatively, after encoding the value of the maximum prediction and/or transform size through the above-described method, the value of the minimum prediction and/or transform size may be encoded by using the value of $\log_2$ (maximum prediction and/or transform size/minimum prediction and/or transform size) indicating the ratio of the maximum prediction and/or transform size to the minimum prediction and/or transform size. On the contrary, after encoding the value of the minimum prediction and/or transform size through the above-described method, the value of the maximum prediction and/or transform size may be encoded by using the value of $\log_2$ (maximum prediction and/or transform size/minimum prediction and/or transform size).

The coded block information indicating whether or not non-zero transform coefficient exists within a predetermined block may be 1-bit flag indicating whether or not non-zero transform coefficient exists within a subblock divided for prediction or transform. In this case, different flags may be encoded with respect to a luma component (Y) block and chroma component (U, V) blocks. With respect to the three blocks of the luma and chroma components (Y, U, V), whether or not non-zero transform coefficients exist may be indicated by a single flag.

Alternatively, after encoding the flag indicating whether or not the non-zero transform coefficients exist within all blocks of the three components (Y, U, V), the transform type may be encoded only when the non-zero transform coefficient exists, and then, the flags indicating whether or not the non-zero transform coefficient exists within the subblocks of the respective chroma components may be encoded, respectively.

According to the above-described embodiments of the present disclosure, the tree encoder generates the tree structure of the image information to be encoded by grouping areas having the same information among areas having image information to be encoded. However, this is merely an example of generating the tree structure, and it is apparent to those skilled in the art that the tree structure may be generated in various manners. For example, the size of the macroblock being the encoding/decoding unit or the size of the subblock for prediction or transform may be determined by repetitively dividing a reference block (for example, a macroblock of the maximum size) into subblocks of smaller sizes. In other words, macroblocks of various sizes or subblocks for prediction or transform may be included in a single picture by dividing the reference block into a plurality of first subblocks, subdividing the first subblocks into second subblocks of smaller sizes, or not subdividing the first subblocks. In this case, whether or not the block is divided into the subblocks is indicated by the division flag. In this manner, the macroblock size information (that is, macroblock division flag) or the subblock size information for prediction or transform (that is, macroblock partition division flag) has the tree structure as shown in FIG. 9B or 9C.

Although exemplary embodiments of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in a video compression processing for encoding and decoding images, which are capable of improving the encoding efficiency and in turn the video compression efficiency by using the tree structure in the encoding of various pieces of image information and the decoding of the resultant encoded data.

What is claimed is:

1. A method performed by a video encoding apparatus for encoding image information using a tree structure, the method comprising:
    determining a minimum block size and a maximum block size;
    encoding, in a bitstream, additional information including first information on the minimum block size and second information on a difference between the maximum block size and the minimum block size, wherein the second information is represented as a logarithm of ratio between the maximum block size and the minimum block size; and
    encoding, in the bitstream, a partition flag indicating whether each block, starting from a block corresponding to an uppermost layer of the tree structure, is divided into blocks of a lower layer, and encoding image information of a block which is not further divided, wherein:
        the block corresponding to the uppermost layer has the maximum block size, and
        the partition flag indicating whether a block having the minimum block size is divided is not encoded in the bitstream, and the block having the minimum block size is not further divided in the tree structure.

2. The method of claim 1, wherein the difference between the minimum block size and the maximum block size has a value of log 2(A/B) where A denotes the maximum block size and B denotes the minimum block size.

3. The method of claim 1, wherein, when a block of an upper layer is divided into blocks of a lower layer, the block of the upper layer is divided into four equal-sized blocks.

4. The method of claim 1, wherein the additional information is included in the bitstream as sequence information.

5. The method of claim 1, wherein the image information includes prediction information and information on residuals used for reconstructing pixels of the block which is not further divided.

6. A video encoding apparatus for encoding image information using a tree structure, the apparatus comprising:
    an additional information encoder, implemented by one or more processors, configured to encode, in a bitstream, additional information including first information on a minimum block size and second information on a difference between a maximum block size and the minimum block size, wherein the second information is represented as a logarithm of ratio between the maximum block size and the minimum block size; and
    a tree encoder, implemented by one or more processors, configured to encode, in the bitstream, a partition flag indicating whether each block, starting from a block corresponding to an uppermost layer of the tree structure, is divided into blocks of a lower layer, and encode image information of a block which is not further divided, wherein:
        the block corresponding to the uppermost layer has the maximum block size, and
        the partition flag indicating whether a block having the minimum block size is divided is not encoded in the bitstream, and the block having the minimum block size is not further divided in the tree structure.

7. The apparatus of claim 6, wherein the difference between the minimum block size and the maximum block size has a value of $\log_2(A/B)$ where A denotes the maximum block size and B denotes the minimum block size.

8. The apparatus of claim 6, wherein, when a block of an upper layer is divided into blocks of a lower layer, the block of the upper layer is divided into four equal-sized blocks.

9. The apparatus of claim 6, wherein the additional information is included in the bitstream as sequence information.

10. The apparatus of claim 6, wherein the image information includes prediction information and information on residuals used for reconstructing pixels of the block which is not further divided.

* * * * *